US009885299B2

(12) United States Patent
Touchette et al.

(10) Patent No.: US 9,885,299 B2
(45) Date of Patent: Feb. 6, 2018

(54) METHOD AND APPARATUS FOR FUEL REGULATION

(71) Applicant: Westport Power Inc., Vancouver (CA)

(72) Inventors: Alain Touchette, Vancouver (CA); James D. Walker, Malvern (GB); Jordan Haas, Adamstown (AU)

(73) Assignee: WESTPORT POWER INC., Vancouver (CA)

( * ) Notice: Subject to any disclaimer, the term of this patent is extended or adjusted under 35 U.S.C. 154(b) by 57 days.

(21) Appl. No.: 14/777,398

(22) PCT Filed: Mar. 6, 2014

(86) PCT No.: PCT/CA2014/050186
§ 371 (c)(1),
(2) Date: Sep. 15, 2015

(87) PCT Pub. No.: WO2014/138955
PCT Pub. Date: Sep. 18, 2014

(65) Prior Publication Data
US 2016/0032849 A1    Feb. 4, 2016

(30) Foreign Application Priority Data

Mar. 15, 2013   (CA) .................................... 2809539

(51) Int. Cl.
*F02D 41/00*   (2006.01)
*F02D 41/12*   (2006.01)
(Continued)

(52) U.S. Cl.
CPC ..... *F02D 41/0027* (2013.01); *F02D 19/0605* (2013.01); *F02D 19/0623* (2013.01);
(Continued)

(58) Field of Classification Search
CPC ............... F02D 41/0027; F02D 41/221; F02D 19/0684; F02D 19/0681; F02D 19/0623;
(Continued)

(56) References Cited

U.S. PATENT DOCUMENTS 5,159,911 A    11/1992 Williams et al.
5,408,970 A    4/1995 Burkhard et al.
(Continued)

FOREIGN PATENT DOCUMENTS

CA    2 794 117 A1    1/2013
CN    1991162 A       7/2007
(Continued)

OTHER PUBLICATIONS

Extended European Search Report, dated Oct. 17, 2016, for European Application No. 14762882.0-1603 / 2971709, 10 pages.
(Continued)

*Primary Examiner* — Joseph Dallo
(74) *Attorney, Agent, or Firm* — Seed IP Law Group LLP

(57) ABSTRACT

A method for fuel regulation during a non-motoring operating mode of an internal combustion engine is provided. A fuel regulator employs a first fuel to regulate pressure of a second fuel. The first fuel is communicated to the fuel regulator through a first fuel circuit. The method comprises actuating a fuel injector that introduces the first fuel and the second fuel into a combustion chamber of the internal combustion engine during the non-motoring operating mode. The fuel injector is actuated with an injection command signal having a pulse width below a predetermined maximum value whereby no fuel is injected into the combustion chamber and the first fuel drains from the first fuel circuit through the fuel injector to a supply tank.

19 Claims, 5 Drawing Sheets

(51) Int. Cl.
*F02D 41/38* (2006.01)
*F02D 19/10* (2006.01)
*F02D 19/06* (2006.01)
*F02D 41/30* (2006.01)
*F02D 41/22* (2006.01)
*F02D 19/08* (2006.01)
*F02D 41/40* (2006.01)

(52) U.S. Cl.
CPC ..... *F02D 19/0665* (2013.01); *F02D 19/0678* (2013.01); *F02D 19/0681* (2013.01); *F02D 19/0684* (2013.01); *F02D 19/0694* (2013.01); *F02D 19/08* (2013.01); *F02D 19/10* (2013.01); *F02D 41/0025* (2013.01); *F02D 41/123* (2013.01); *F02D 41/221* (2013.01); *F02D 41/30* (2013.01); *F02D 41/3872* (2013.01); *F02D 41/3047* (2013.01); *F02D 41/402* (2013.01); *F02D 2041/224* (2013.01); *F02D 2041/3881* (2013.01); *Y02T 10/36* (2013.01)

(58) Field of Classification Search
CPC .. F02D 19/08; F02D 19/0665; F02D 19/0694; F02D 19/0605; F02D 41/30; F02D 19/0678; F02D 19/10; F02D 41/123; F02D 41/0025
See application file for complete search history.

(56) References Cited

U.S. PATENT DOCUMENTS

| | | | |
|---|---|---|---|
| 5,441,029 A | 8/1995 | Hlousek | |
| 5,711,274 A * | 1/1998 | Drummer | F02D 41/042 |
| | | | 123/456 |
| 5,711,574 A | 1/1998 | Drummer | |
| 5,727,525 A | 3/1998 | Tsuzuki | |
| 5,785,025 A * | 7/1998 | Yoshiume | F02D 33/003 |
| | | | 123/458 |
| 6,267,104 B1 * | 7/2001 | Monnier | F02M 25/089 |
| | | | 123/179.17 |
| 6,298,833 B1 | 10/2001 | Douville et al. | |
| 2003/0168101 A1 * | 9/2003 | Sulatisky | F02D 41/0027 |
| | | | 137/487.5 |
| 2007/0144490 A1 | 6/2007 | Serra et al. | |
| 2007/0199539 A1 | 8/2007 | Lennox et al. | |
| 2008/0103676 A1 * | 5/2008 | Ancimer | F02D 19/10 |
| | | | 701/103 |
| 2010/0077989 A1 * | 4/2010 | Yamakawa | F02D 13/0219 |
| | | | 123/299 |
| 2011/0088655 A1 * | 4/2011 | Ancimer | F02D 41/0027 |
| | | | 123/299 |
| 2014/0123948 A1 * | 5/2014 | Mittal | F02M 45/086 |
| | | | 123/456 |
| 2014/0174402 A1 * | 6/2014 | Steffen | F02D 19/06 |
| | | | 123/446 |
| 2014/0331963 A1 * | 11/2014 | Grant | F02D 19/0694 |
| | | | 123/304 |
| 2015/0247468 A1 * | 9/2015 | Chittenden | F02D 19/0694 |
| | | | 123/490 |

FOREIGN PATENT DOCUMENTS

| | | | | |
|---|---|---|---|---|
| EP | 1 031 721 A2 | 8/2000 | | |
| WO | WO 03074862 A1 * | 9/2003 | ........... | F02D 33/006 |

OTHER PUBLICATIONS

International Search Report dated May 30, 2014, for corresponding International Application No. PCT/CA2014/050186, 3 pages.
Chinese First Office Action, dated Jul. 7, 2017, for Chinese Application No. 2014800139493, 4 pages. (with English Translation).
Chinese Search Report, dated Jul. 7, 2017, for Chinese Application No. 2014800139493, 4 pages. (with English Translation).

* cited by examiner

METHOD AND APPARATUS FOR FUEL REGULATION

FIELD OF THE INVENTION

The present application relates to a technique of operating a fuel regulator that employs a first fuel to regulate a second fuel, and more specifically for preventing hydraulic lock in a first fuel rail preventing correct operation of the fuel regulator.

BACKGROUND OF THE INVENTION

Referring to FIG. 1, a pilot fuel can be employed in Diesel-cycle internal combustion engine 100 to ignite a main fuel when the main fuel has a high octane number making it difficult to auto-ignite. Pilot fuel is introduced into combustion chambers (not shown) where it auto-ignites because of the pressure and temperature environment, and the subsequent combustion of pilot fuel creates an environment that is suitable to ignite the main fuel. Fuel injectors that introduce both the pilot and main fuels into the combustion chambers, such as fuel injector 110, can employ the pilot fuel in fluid seals (not shown) for sealing the main fuel inside the injector body, for example when the pilot fuel is a liquid fuel like diesel and the main fuel is a gaseous fuel like natural gas. A gaseous is defined as a fuel in a gas state at a pressure of 1 atmosphere and a temperature of 25 degrees Celsius within this specification. Only one such fuel injector is shown in engine 100, but as would be understood by those familiar with the technology there can be one or more fuel injectors. The Applicant's own U.S. Pat. No. 7,124,959, issued Oct. 24, 2006 to Baker et al., hereinafter the '959 reference, discloses a dual fuel injection valve that injects separately and independently two different fuels, which can be employed to introduce the pilot and main fuels, and employs fluid seals to seal main fuel cavities within the injector from other cavities. The differential pressure between the pilot fuel and the main fuel (referred to herein as the bias) is maintained within a range of tolerance for the fluid seals and injector valve 110 to function correctly. One technique for regulating the bias is to employ dome loaded regulator 120 that uses pilot fuel pressure in piping 130 as a loading mechanism for regulating main fuel pressure in piping 140, which is equal to pilot fuel pressure minus the bias. The pilot fuel is pressurized by pilot pumping apparatus 150 and delivered to fuel injector 110 and dome loaded regulator 120 at pilot fuel injection pressure through a pilot fuel circuit comprising common rail 160 and piping 130. Pressure sensor 165 sends signals representative of pilot fuel injection pressure in common rail 160 to control 250. Pilot fuel pumping apparatus 150 can comprise an inlet metering valve (not shown) and a common rail pump (not shown), as is known by those familiar with the technology. The main fuel is pressurized by main pumping apparatus 170 in main fuel supply system 180 and delivered to dome loaded regulator 120 where its pressure is reduced and then delivered to fuel injector 110 through a main fuel circuit comprising piping 140 and main fuel rail 190. Pressure sensor 195 sends signals representative of main fuel injection pressure in main fuel rail 190 to control 250.

In certain operating modes of the internal combustion engine the fuelling commands (injection amount per stroke) for the pilot and main fuels are reduced to zero, as illustrated in FIG. 2 where main fuelling command 300 and pilot fuel command 310 are reduced to zero at time $T_1$. Before time $T_1$ is a motoring operating mode when fuel is injected and ignited in the combustion chamber engine 100. After time $T_1$, is a non-motoring operating mode when no fuel is introduced into the combustion chamber. The fuelling command can reduce to zero when, for example, a vehicle driven by engine 100 decelerates. During zero fuelling command, main injection command signals sent through wire 230 and pilot injection command signals sent through wire 240 from electrical controller 250 (seen in FIG. 1) to actuate fuel injector 110 are stopped such that no fuel is introduced to the combustion chambers. Additionally, pilot pumping apparatus 150 that pressurizes the pilot fuel is commanded by controller 250 to stop, suspend or shut-off pilot flow to the pilot fuel circuit. The pilot fuel circuit becomes a closed volume of pressurized fluid that goes into a state of hydraulic lock, since no pilot fuel can enter or leave this circuit. Pilot pumping apparatus 150 can only control how much fluid is added to the pilot fuel circuit and does not allow any back flow. Piston 205 inside dome loaded regulator 120 is prevented from decreasing the volume of the pilot fuel circuit when the pilot fuel is an incompressible liquid, such as diesel. Valve 200 inside dome loaded regulator 120, which is connected with piston 205 and regulates the flow of main fuel between pumping apparatus 170 and piping 140, is prevented from closing when the pilot fuel circuit is hydraulically locked causing loss of main fuel pressure regulation. Referring to FIG. 3, loss of main fuel pressure regulation results in main fuel injection pressure 320 (in rail 190 as seen in FIG. 2) increasing towards pilot fuel injection pressure 330 (in rail 160), reducing the bias between these two fuels. The fluid seals within fuel injector 110 begin to leak main fuel from the main fuel cavities into cavities filled with pilot fuel when the main fuel pressure rises above the pilot fuel pressure (negative bias) caused by the malfunctioning dome loaded regulator. Negative bias is illustrated in FIG. 3 between the pilot and main fuels after time $T_2$.

Fuel injection and/or combustion does not occur as expected when the fuelling command is increased from zero under conditions of negative bias. Fuel injector 110 may fail to inject the pilot fuel or the main fuel, or both fuels, and if fuel is injected reduced ignition performance can occur. Injection and ignition problems are caused by the displacement of pilot fuel by main fuel inside fuel injector 110, which can prevent pilot and main injection valves from opening and/or incorrect injections of both pilot and main fuel. Only after several injection events does the bias return to within the predetermined range of tolerance and main fuel is cleared from pilot fuel cavities within fuel injector 110, after which injection and combustion successfully occurs. Another consequence of negative bias is contamination of pilot fuel drain circuit 210 with main fuel. This is caused by main fuel draining from pilot fuel cavities within fuel injector 110 into pilot fuel drain circuit 210 during injection events. Pilot fuel drain circuit 210 returns pilot fuel to supply tank 220 which for some known pilot fuels, such as diesel, is not designed to be sealed under all conditions (such as when being refilled). The contamination of drain circuit 210 with main fuel results in an increase in unburned hydrocarbon emissions when the main fuel is a gaseous fuel.

U.S. Pat. No. 5,711,274, issued Jan. 27, 1998 to Eugen Drummer (the Drummer reference), discloses a technique of reducing a high pressure in a common rail after an engine associate with the common rail is shut down. Previous common rail injection systems had the disadvantage of the high fuel pressure remaining in the system for a long time after the engine was shut down, which made maintenance and repair work on the fuel injection system quite dangerous. Drummer teaches to activate a magnetic valve that actuates a control valve inside a fuel injector that, depending on the structural design of the fuel injector, briefly relieves pressure in a control chamber at the valve member or briefly increases the pressure on a pressure chamber acting upon the valve member in the opening direction, followed by refilling of the control chamber or pressure relief of the pressure chamber, such that the high pressure can be reduced continuously via a relief line into a supply tank.

The present method and apparatus provide a technique for operation of a regulator that regulates the pressure of one fuel based on the pressure of another fuel.

SUMMARY OF THE INVENTION

An improved method is provided for fuel regulation during a non-motoring operating mode of an internal combustion engine. A fuel regulator employs a first fuel to regulate pressure of a second fuel, and the first fuel is communicated to the fuel regulator through a first fuel circuit. The method comprises actuating a fuel injector that introduces the first fuel and the second fuel into a combustion chamber of the internal combustion engine during the non-motoring operating mode. The fuel injector is actuated with an injection command signal having a pulse width below a predetermined maximum value whereby no fuel is injected into the combustion chamber and the first fuel drains from the first fuel circuit through the fuel injector to a supply tank.

The injection command signal can activate an actuator in the fuel injector associated with injecting the first fuel into the combustion chamber, or can activate an actuator in the fuel injector associated with injecting the second fuel into the combustion chamber. The fuel injector can also be actuated with the injection command signal during a motoring operating mode. The first fuel can be a pilot fuel and the second fuel can be a main fuel. The first fuel can also be a liquid fuel and the second fuel can be a gaseous fuel. The first fuel can also be diesel and the second fuel can be natural gas. The fuel regulator can be a dome loaded regulator. In a preferred embodiment the method further comprises monitoring the first fuel pressure and the second fuel pressure; and adjusting the pulse width as a function of the first fuel pressure and the second fuel pressure.

An improved method for fuel regulation during a non-motoring operating mode of an internal combustion engine is provided. A fuel regulator employs a first fuel to regulate pressure of a second fuel, and the first fuel is communicated to the fuel regulator through a first fuel circuit. The method comprises one of:

(1) actuating a fuel injector that introduces the first fuel and the second fuel into a combustion chamber of the internal combustion engine during the non-motoring operating mode, the fuel injector is actuated with an injection command signal having a pulse width below a predetermined maximum value whereby no fuel is injected into the combustion chamber and the first fuel drains from the first fuel circuit through the fuel injector to a supply tank;

(2) employing an orifice to drain fuel from the first fuel circuit at a predetermined flow rate; and (3) employing an electronic solenoid valve to drain fuel from the first fuel circuit.

An apparatus is provided for fuel regulation during a non-motoring operating mode of an internal combustion engine. A fuel regulator employs a first fuel to regulate pressure of a second fuel, and the first fuel is communicated to the fuel regulator through a first fuel circuit. The apparatus comprises a fuel injector that introduces the first fuel and the second fuel into a combustion chamber of the internal combustion engine. An electronic controller is operatively connected with the fuel injector and programmed to actuate the fuel injector during the non-motoring operating mode with an injection command signal having a pulse width below a predetermined maximum value whereby no fuel is injected into the combustion chamber and the first fuel drains from the first fuel circuit through the fuel injector to a supply tank. The electronic controller can be further programmed to actuate the fuel injector with the injection command signal during a motoring operating mode. The first fuel can be a pilot fuel and the second fuel can be a main fuel. The first fuel can also be a liquid fuel and the second fuel can be a gaseous fuel. The first fuel can also be diesel and the second fuel can be natural gas. The fuel regulator can be a dome loaded regulator.

In a preferred embodiment the apparatus further comprises a first fuel pressure sensor emitting signals representative of the first fuel pressure; and a second fuel pressure sensor emitting signals representative of the second fuel pressure. The electronic controller is operatively connected with the first fuel pressure sensor and the second fuel pressure sensor and programmed to determine the pulse width as a function of the first fuel pressure and the second fuel pressure.

In a preferred embodiment the fuel injector comprises a first actuator and a first fuel injection valve associated with the first actuator. The first actuator is responsive to the injection command signal to drain the first fuel to the supply tank. In another preferred embodiment the fuel injector comprises a second actuator and a second fuel injection valve associated with the second actuator. The second actuator is responsive to the injection command signal to drain the first fuel to the supply tank. In yet another preferred embodiment there can be first and second injection command signals. The first actuator is responsive to the first injection command signal to drain the first fuel to the supply tank, and the second actuator is responsive to the second injection command signal to drain the first fuel to the supply tank.

DETAILED DESCRIPTION OF PREFERRED EMBODIMENT(S)

Figure 1:
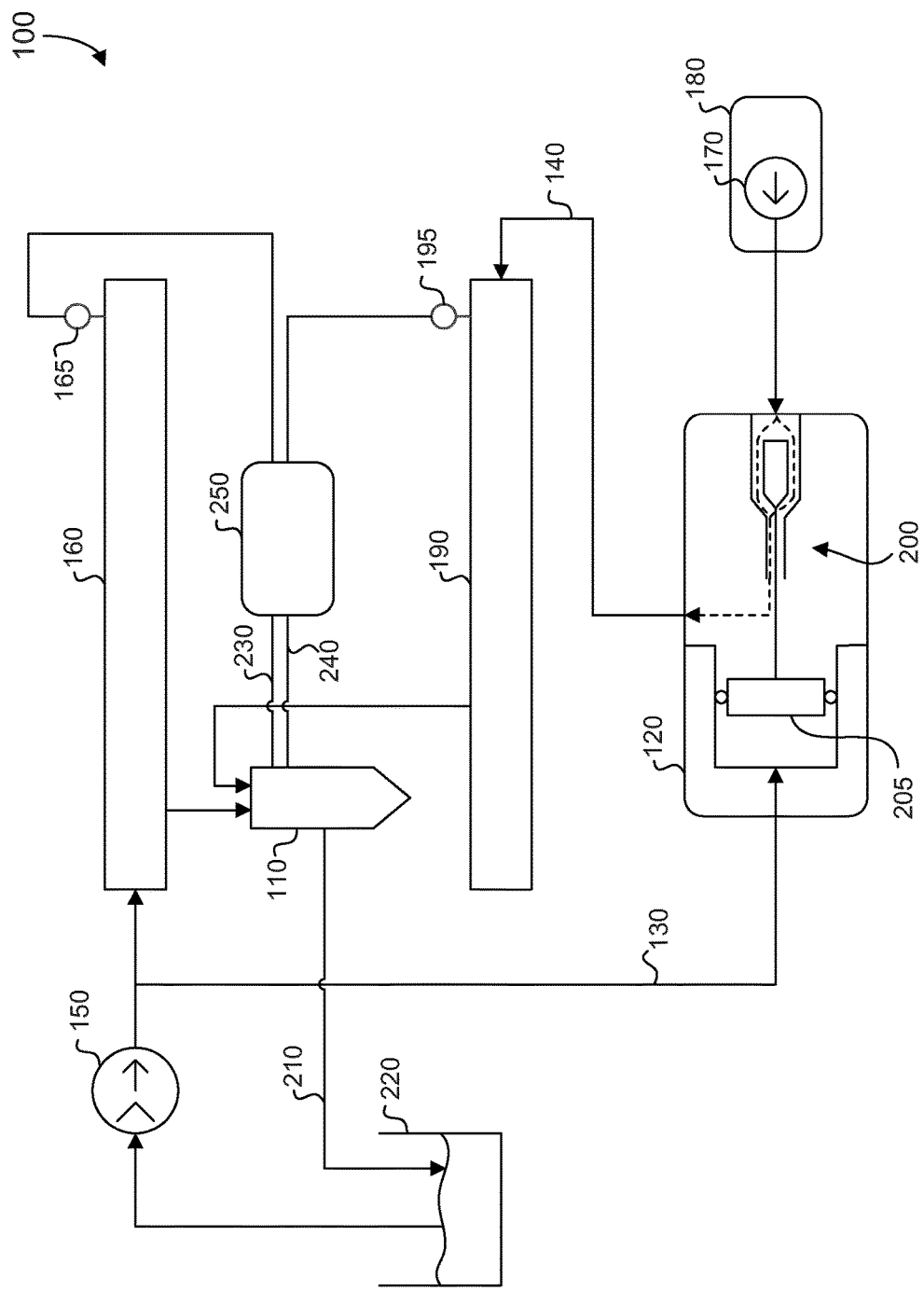
FIG. 1 is a schematic view of a fuel system for a Diesel-cycle internal combustion engine that consumes a pilot fuel and a main fuel.
Figure 2:
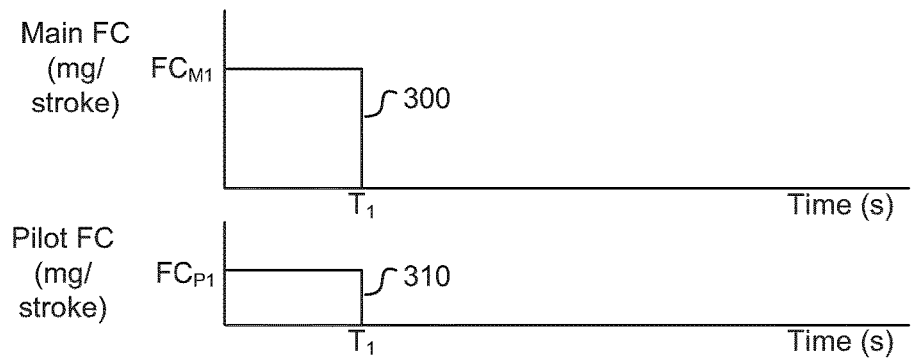
FIG. 2 is a graphical view of prior art main fuelling command and pilot fuelling command showing a motoring operating mode before time $T_1$ and a non-motoring operating mode after time $T_1$.
Figure 3:
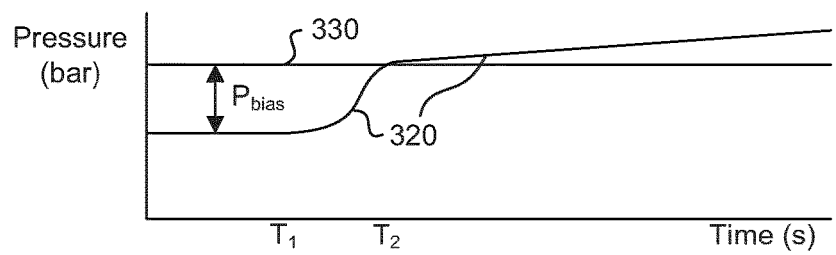
FIG. 3 is a graphical view of prior art main fuel injection pressure and pilot fuel injection pressure showing a bias within a predetermined range of tolerance between these two pressures before time $T_1$ and the bias outside the predetermined range of tolerance after time $T_1$ for the fuelling commands of FIG. 2.

A technique of preventing hydraulic lock in the pilot circuit that takes advantage of the operation of fuel injector 110 is now discussed. The '959 reference discloses employing the pilot fuel as a controlling fluid for actuating valves inside fuel injectors, such as fuel injector 110 in FIG. 1, for introducing both the pilot fuel and the main fuel (concurrently or separately) into combustion chambers. A pilot fuel actuator (not shown) in fuel injector 110 can be activated by a pilot injection command signal sent through wire 240 to actuate a pilot control valve (not shown) inside fuel injector 110 to drain pilot fuel from a pilot control chamber (not shown). A pilot needle begins to move away from a pilot valve seat resulting in the injection of pilot fuel into the combustion chamber when the pressure in the pilot control chamber decreases below a pilot threshold. In a similar manner, a main fuel actuator (not shown) in fuel injector 110 can be activated by a main injection command signal sent through wire 230 to actuate a main control valve inside fuel injector 110 to drain pilot fuel from a main control chamber. A main needle begins to move away from a main valve seat resulting in the injection of main fuel into the combustion chamber when the pressure in the main control chamber decreases below a main threshold. In other embodiments it is possible to design fuel injector 110 to cause a build-up of pressure in the pilot and main control chambers when the pilot and main actuators are activated, resulting in the displacement of the pilot and main needles respectively. Pilot fuel from the pilot control chamber is returned to supply tank 220 through drain circuit 210 for each activation of the pilot actuator. Pilot fuel from the main control chamber is returned to supply tank 220 through drain circuit 210 for each activation of the main actuator.

Figure 4:
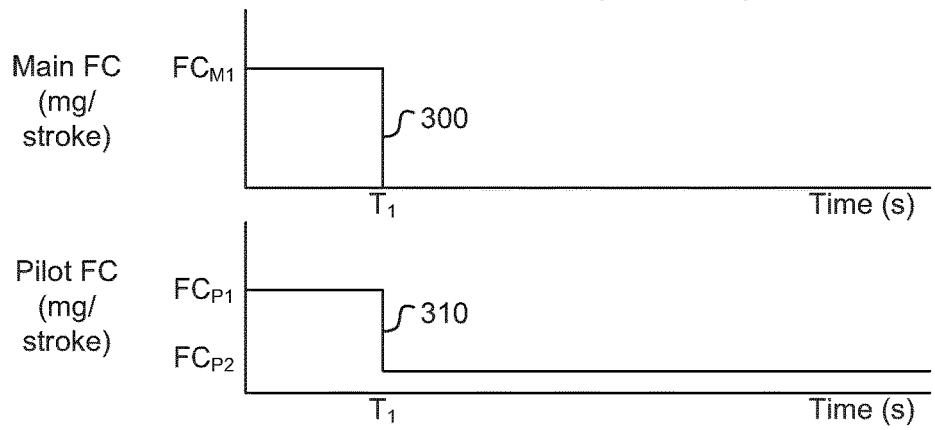
FIG. 4 is a graphical view of main fuelling command and pilot fuelling command according to one embodiment showing a motoring operating mode before time $T_1$ and a non-motoring operating mode after time $T_1$.

Referring to FIG. 4, there is shown main fuelling command 300 and pilot fuelling command 310 according to a first embodiment employed to create injection command signals for fuel injector 110 (seen in FIG. 1). Before time $T_1$, engine 100 is in a motoring operating mode where main fuelling command 300 has a value of $FC_{M1}$ and pilot fuelling command has a value of $FC_{P1}$, such that both the main and pilot fuels are injected and combusted in the combustion chambers of engine 100. After time $T_1$, engine 100 enters a non-motoring operating mode where main fuelling command 300 reduces to zero, but pilot fuelling command 310 decreases to value $FC_{P2}$, such that no fuel is injected into the combustion chambers of engine 100. Pilot fuelling command value $FC_{P2}$ is below a predetermined maximum value that results in no movement of the pilot needle.

Figure 6:
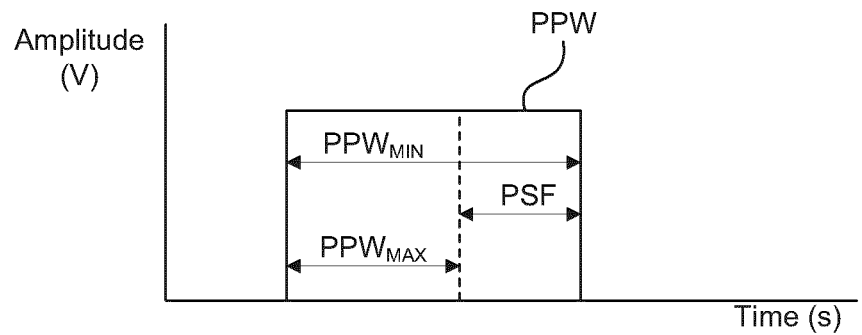
FIG. 6 is a graphical view of pilot injection command signals sent through a wire for actuating a fuel injector of FIG. 1 showing a minimum pulse width $PPW_{MIN}$ required to inject pilot fuel into a combustion chamber, and a maximum pulse width $PPW_{MAX}$ that actuates the fuel injector to drain pilot fuel to a supply tank while not injecting pilot fuel into the combustion chamber.

Referring to FIG. 6, each pilot fuelling command value has an associated pilot injection command signal (sent through wire 240), which is an electrical signal that can be represented as a square wave having a pilot pulse width PPW. For the pilot needle to move away from the pilot valve seat, the pressure in the pilot control chamber decreases below the pilot threshold. The pilot actuator is actuated by a pilot injection command signal having minimum pulse width of $PPW_{MIN}$ for the pressure in the pilot control chamber to decrease below the pilot threshold causing the pilot needle to move away from the pilot valve seat and pilot fuel to be injected into the combustion chamber. Referring now to both FIGS. 4 and 6, when pilot fuelling command 310 has a value of $FC_{P2}$ after time $T_1$, the pilot actuator is actuated by a pilot injection command signal having a pulse width less than or equal to maximum pulse width $PPW_{MAX}$ such that the pressure in the pilot control chamber does not decrease below the pilot threshold and the pilot needle does not move away from the pilot valve seat, allowing no injection of pilot fuel into the combustion chamber. The difference between $PPW_{MIN}$ and $PPW_{MAX}$ is a predetermined range of tolerance allowed between these values, also known as pilot safety factor PSF. When fuel injector 110 is actuated by a pilot injection command signal of pulse width less than or equal to $PPW_{MAX}$, no pilot fuel is injected to the combustion chamber but pilot fuel is drained to supply tank 220 through drain circuit 210. During the non-motoring operating mode in FIG. 4 after time $T_1$, the value of pilot fuelling command 310 is less than a maximum pilot fuelling command value associated with maximum pulse width $PPW_{MAX}$ such that no pilot fuel is injected into the combustion chamber but pilot fuel is allowed to drain from the pilot circuit during pilot injection events thereby preventing hydraulic lock and loss of fuel regulation by a dome loaded regulator. Pilot pulse width PPW during the non-motoring operating mode can be selected as a function of the bias between main fuel pressure and pilot fuel pressure, as determined by pressure sensors 165 and 195.

Figure 5:
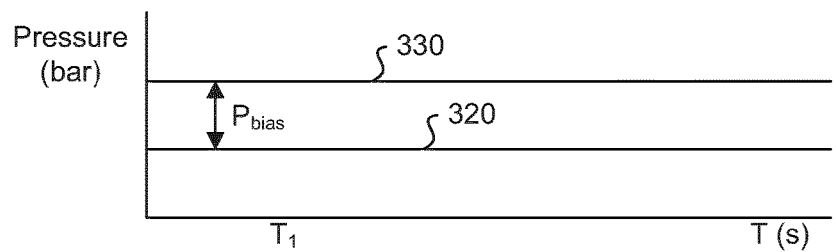
FIG. 5 is a graphical view of main fuel injection pressure and pilot fuel injection pressure showing a bias within a predetermined range of tolerance between these two pressures before and after time $T_1$ for the fuelling commands of FIG. 4.

Referring now to FIG. 5, the bias between main fuel injection pressure 320 and pilot fuel injection pressure 330 is maintained during the non-motoring operating mode, thereby preventing displacement of pilot fuel by main fuel within pilot fuel cavities inside fuel injector 110. When engine 100 returns to a motoring operating mode both injection and combustion of pilot and main fuel are within normal operating parameters of engine 100.

Figure 7:
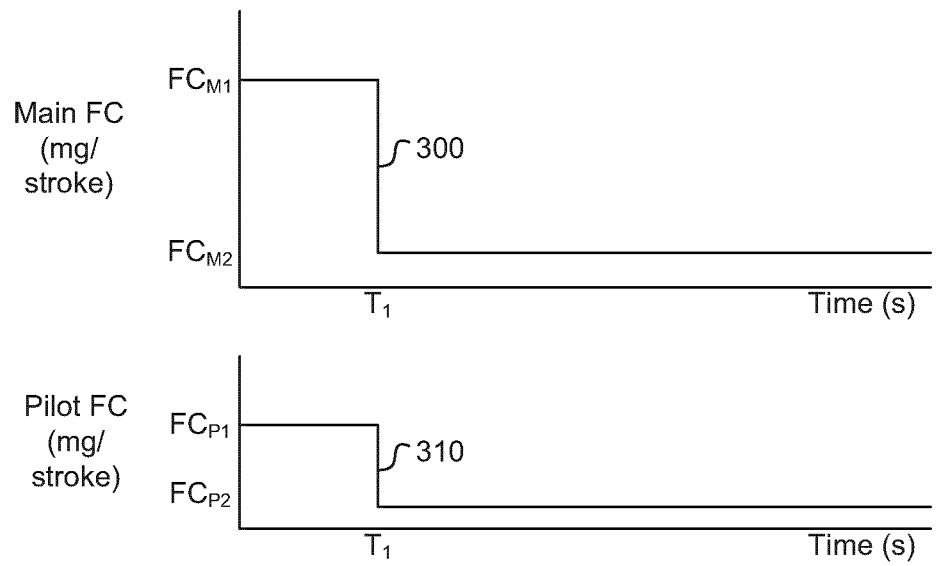
FIG. 7 is a graphical view of main fuelling command and pilot fuelling command according to a second embodiment showing a motoring operating mode before time $T_1$ and a non-motoring operating mode after time $T_1$.
Figure 8:
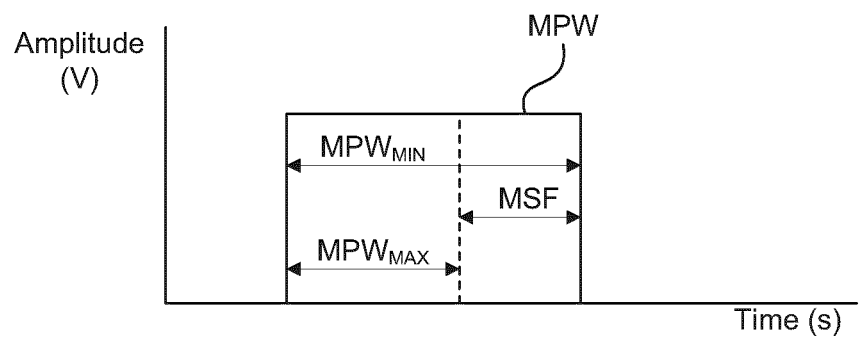
FIG. 8 is a graphical view of main injection command signals sent through a wire for actuating a fuel injector of FIG. 1 showing a minimum pulse width $MPW_{MIN}$ required to inject main fuel into a combustion chamber, and a maximum pulse width $MPW_{MAX}$ that actuates the fuel injector to drain pilot fuel to a supply tank while not injecting main fuel into the combustion chamber.

Referring now to FIG. 7, there is shown main fuelling command 300 and pilot fuelling command 310 according to a second embodiment employed to create main and pilot injection command signals for fuel injector 110 (seen in FIG. 1). This embodiment is similar to the previous embodiment and like parts have like reference numerals and will not be described in detail, if at all. In addition to pilot fuelling command value $FC_{P2}$ during the non-motoring operating mode after time $T_1$, or alternatively, main fuelling command 300 can have value $FC_{M2}$ to actuate fuel injector 110 to drain pilot fuel to supply tank 220. Referring to FIG. 8, each main fuelling command value has an associated main injection command signal (sent through wire 230), which is an electrical signal that can be represented as a square wave having a main pulse width MPW. For the main needle to move away from the main valve seat, the pressure in the main control chamber decreases below the main threshold. The main actuator is actuated by a main injection command signal having minimum pulse width of $MPW_{MIN}$ for the pressure in the main control chamber to decrease below the main threshold causing the main needle to move away from the main valve seat and main fuel to be injected into the combustion chamber. Referring to both FIGS. 7 and 8, when main fuelling command 300 has a value of $FC_{M2}$ after time $T_1$, the main actuator is actuated by a main injection command signal having a pulse width less than or equal to maximum pulse width $MPW_{MAX}$ such that the pressure in the main control chamber does not decrease below the main threshold and the main needle does not move away from the main valve seat, resulting in no injection of main fuel into the combustion chamber. The difference between $MPW_{MIN}$ and $MPW_{MAX}$ is a predetermined range of tolerance allowed between these values, also known as main safety factor MSF. When fuel injector 110 is actuated by a main injection command signal of pulse width less than or equal to $MPW_{MAX}$, no main fuel is injected to the combustion chamber but pilot fuel is drained to supply tank 220 through drain circuit 210. During the non-motoring operating mode in FIG. 7 after time $T_1$, the value of main fuelling command 300 is less than a maximum main fuelling command value associated with maximum pulse width $MPW_{MAX}$ such that no main fuel is injected into the combustion chamber but pilot fuel is allowed to drain from the pilot circuit during main injection events thereby preventing hydraulic lock and loss of fuel regulation by the dome loaded regulator. Main pulse width PPW during the non-motoring operating mode can be selected as a function of the bias between main fuel pressure and pilot fuel pressure, as determined by pressure sensors 165 and 195.

Both, or either, pilot injection events and main injection events can be employed to provide flow from the pilot circuit to drain circuit 210 thereby preventing hydraulic lock and loss of fuel regulation by the dome loaded regulator. The minimum pulse widths $PPW_{MIN}$ and $MPW_{MIN}$ are normally different and the maximum pulse widths $PPW_{MAX}$ and $MPW_{MAX}$ are normally different since the mechanical elements (for example springs and needles) employed in the pilot and main injection valves inside fuel injector 110 are normally different.

Figure 9:
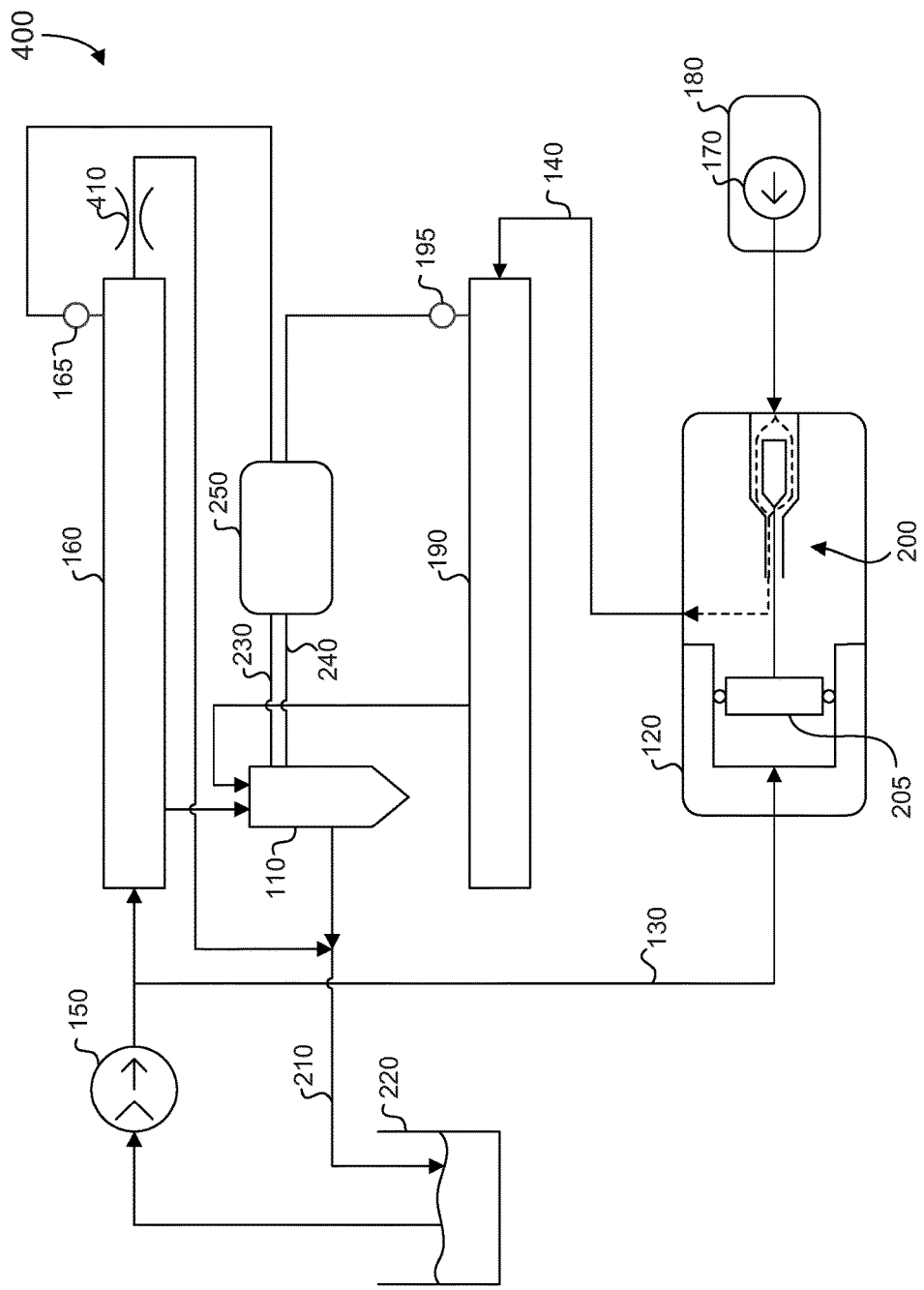
FIG. 9 is a schematic view of a fuel system for a Diesel-cycle internal combustion engine that consumes a pilot fuel and a main fuel according to a second embodiment employing a drain orifice from a pilot fuel common rail.

Referring now to FIG. 9 there is shown engine 400 according to a second embodiment where like parts to previous embodiments have like reference numerals and will not be described in detail, if at all. Pilot fuel common rail 160 comprises orifice 410 which allows pilot fuel to drain to drain circuit 210 at a predetermined flow rate. Since pilot fuel is continuously draining from the common rail, hydraulic lock and loss of fuel regulation by the dome loaded regulator is prevented.

Figure 10:
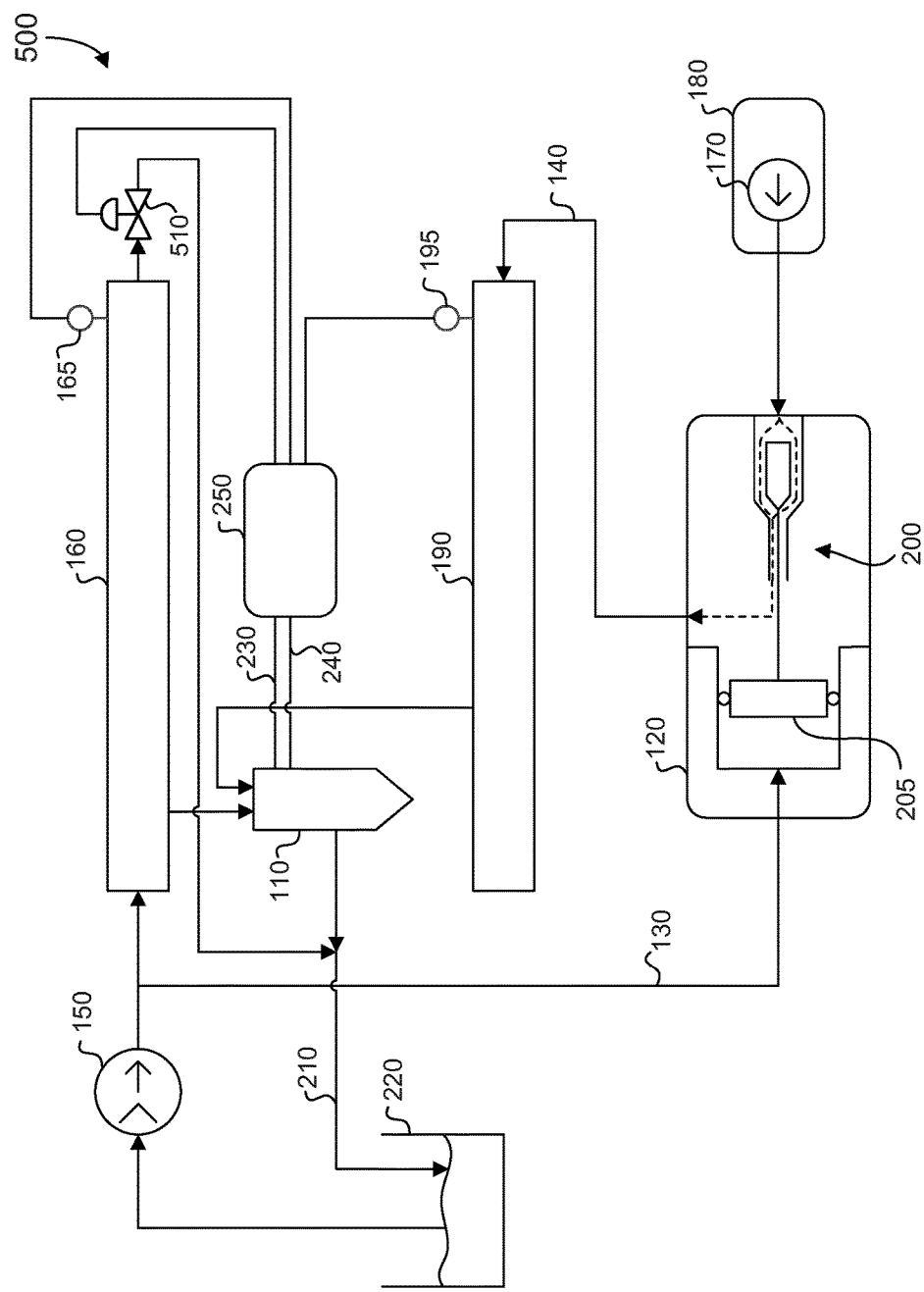
FIG. 10 is a schematic view of a fuel system for a Diesel-cycle internal combustion engine that consumes a pilot fuel and a main fuel according to a third embodiment employing an electronic solenoid valve.

Referring now to FIG. 10 there is shown engine 500 according to a second embodiment where like parts to previous embodiments have like reference numerals and will not be described in detail, if at all. Electronic solenoid valve 510 is actuated by controller 250 to allow pilot fuel to flow to drain circuit 210 preventing hydraulic lock and loss of fuel regulation by the dome loaded regulator.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for fuel regulation during a non-motoring operating mode of an internal combustion engine, a fuel regulator employing a first fuel to regulate pressure of a second fuel, said first fuel communicated to said fuel regulator through a first fuel circuit, the method comprising:
   actuating a fuel injector, that introduces said first fuel and said second fuel into a combustion chamber of said internal combustion engine during said non-motoring operating mode, said fuel injector actuated with an injection command signal, the injection command signal having a pulse width below a predetermined maximum value whereby no fuel is injected into said combustion chamber and said first fuel drains from said first fuel circuit through said fuel injector to a supply tank; and
   maintaining a bias between a first fuel injection pressure and a second fuel injection pressure as said first fuel drains from said first fuel circuit.

2. The method of claim 1, wherein said injection command signal activates an actuator in said fuel injector associated with injecting said first fuel into said combustion chamber.

3. The method of claim 1, wherein said injection command signal activates an actuator in said fuel injector associated with injecting said second fuel into said combustion chamber.

4. The method of claim 1, further comprising actuating said fuel injector with said injection command signal during a motoring operating mode, said injection command signal which actuates said fuel injector during the motoring operating mode having a pulse width above a predetermined minimum value whereby fuel is injected into said combustion chamber.

5. The method of claim 1, wherein said first fuel is a pilot fuel and said second fuel is a main fuel.

6. The method of claim 1, wherein said first fuel is a liquid fuel and said second fuel is a gaseous fuel.

7. The method of claim 1, wherein said first fuel is diesel and said second fuel is natural gas.

8. The method of claim 1, further comprising:
   monitoring a pressure of said first fuel and a pressure of said second fuel; and
   adjusting said pulse width as a function of said pressure of said first fuel and said pressure of said second fuel.

9. The method of claim 1, wherein said fuel regulator is a dome loaded regulator.

10. A method for fuel regulation during a non-motoring operating mode of an internal combustion engine, a fuel regulator employing a first fuel to regulate pressure of a second fuel, said first fuel communicated to said fuel regulator through a first fuel circuit, said fuel regulator being a dome loaded regulator, the method comprising:
    actuating a fuel injector that introduces said first fuel and said second fuel into a combustion chamber of said internal combustion engine during said non-motoring operating mode, said fuel injector actuated with an injection command signal having a pulse width below a predetermined maximum value whereby no fuel is injected into said combustion chamber and said first fuel drains from said first fuel circuit through said fuel injector to a supply tank; and
    maintaining a bias between a first fuel injection pressure and a second fuel injection pressure as said first fuel drains from said first fuel circuit.

11. An apparatus for fuel regulation during a non-motoring operating mode of an internal combustion engine, a fuel regulator employing a first fuel to regulate pressure of a second fuel, said first fuel communicated to said fuel regulator through a first fuel circuit, the apparatus comprising:
a fuel injector that introduces said first fuel and said second fuel into a combustion chamber of said internal combustion engine;
an electronic controller operatively connected with said fuel injector and programmed to:
actuate said fuel injector during said non-motoring operating mode with an injection command signal, the injection command signal having a pulse width below a predetermined maximum value whereby no fuel is injected into said combustion chamber, said first fuel drains from said first fuel circuit through said fuel injector to a supply tank and a bias between a first fuel injection pressure and a second fuel injection pressure is maintained as said first fuel drains from said first fuel circuit.

12. The apparatus of claim 11, further comprising:
a first fuel pressure sensor emitting signals representative of said first fuel pressure; and
a second fuel pressure sensor emitting signals representative of said second fuel pressure;
said electronic controller operatively connected with said first fuel pressure sensor and said second fuel pressure sensor and programmed to determine said pulse width as a function of said signals representative of said first fuel pressure and said second fuel pressure.

13. The apparatus of claim 11, said fuel injector comprising an actuator and a first fuel injection valve associated with said actuator, said actuator responsive to said injection command signal to drain said first fuel to said supply tank.

14. The apparatus of claim 11, said fuel injector comprising an actuator and a second fuel injection valve associated with said actuator, said actuator responsive to said injection command signal to drain said first fuel to said supply tank.

15. The apparatus of claim 11, wherein said electronic controller is further programmed to actuate said fuel injector with said injection command signal during a motoring operating mode, said injection command signal which actuates said fuel injector during the motoring operating mode having a pulse width above a predetermined minimum value whereby fuel is injected into said combustion chamber.

16. The apparatus of claim 11, wherein said first fuel is a pilot fuel and said second fuel is a main fuel.

17. The apparatus of claim 11, wherein said first fuel is a liquid fuel and said second fuel is a gaseous fuel.

18. The apparatus of claim 11, wherein said first fuel is diesel and said second fuel is natural gas.

19. The apparatus of claim 11, wherein said fuel regulator is a dome loaded regulator.

* * * * *

UNITED STATES PATENT AND TRADEMARK OFFICE
CERTIFICATE OF CORRECTION

PATENT NO. : 9,885,299 B2
APPLICATION NO. : 14/777398
DATED : February 6, 2018
INVENTOR(S) : Alain Touchette et al.

It is certified that error appears in the above-identified patent and that said Letters Patent is hereby corrected as shown below:

In the Claims

Column 8, Line 11 Claim 1:
"internal combustion engine during said non-motoring" should read, --internal combustion engine, during said non-motoring--.

Signed and Sealed this
Thirteenth Day of November, 2018

Andrei Iancu
*Director of the United States Patent and Trademark Office*